United States Patent Office 2,935,491
Patented May 3, 1960

2,935,491

SYNERGISTIC STABILIZER COMPOSITION CONTAINING A BENZOATE, A PHENOLATE, AND TRIPHENYL PHOSPHITE

Gerry P. Mack, Jackson Heights, N.Y., assignor to Metal & Thermit Corporation, Rahway, N.J., a corporation of New Jersey No Drawing. Application December 13, 1956
Serial No. 628,011

5 Claims. (Cl. 260—45.75)

The present invention relates to compositions useful as stabilizers for halogen-containing resins.

During the forming of resins into plastic sheets, rigid bodies, etc., the materials are worked at high temperatures. High temperature working of the material facilitates the forming operation and decreases the time at heat needed, thus, increasing capacity of the equipment. When worked at high temperatures resins deteriorate rapidly. This is evidenced first by a yellowing and then a progressive darkening of the material; the initially colorless transparent stock turning, in stages, yellow, tan, and then brown, black and opaque.

Commercial resins must have reproducible color characteristics for specified process conditions, and must retain these color characteristics during service life. To overcome the effects of heat deterioration, stabilizer compositions have been added to the resin formulation before processing. To be effective, a stabilizer must stabilize the resin to prevent the deteriorative effects of heat and also light, and must be compatible in the resin formulation.

Certain metallic salts of fatty acids, and particularly the barium and cadmium salts, have been used as stabilizers. Metallic salts of these acids have a tendency to diminish the clarity of the stabilized resin and to "plate out," particularly when used in formulations compounded with the newer types of vinyl resins made by the suspension process. Thus, resin formulations containing these salts of fatty acids, or of so called "synthetic fatty acids," which are somewhat better than the fatty acids, form a scum of film on the rolls during working. This is caused by spewing or blooming of the stabilizers during working. Resin film, sheeting, etc., thus effected, has unsightly appearance and is difficult to heat seal. The formation of this scum of film on the rolls necessitates frequent work stoppages for cleaning.

Many attempts have been made to develop an economic stabilizer which has superior stabilization properties, which yields a stabilized resin of good clarity, and which is compatible in the resin formulation, under the process conditions utilized. So far as I am aware, none of these attempts have been entirely successful. I have now discovered a superior stabilizer effective to prevent the deteriorative effects of heat and light, which also has excellent compatibility in resin formulations.

It is an object of the present invention to provide a composition effective to stabilize halogen-containing resins and to provide a high degree of color retention.

The invention also contemplates providing resin compositions, composed of mutually compatible materials that are stabilized against the deteriorative effects of heat and light.

It is still another object of the invention to provide stabilized halogen-containing resin of unusual clarity.

Other objects and advantages of the present invention will become apparent from the following description and claims.

Broadly stated, the present invention contemplates a resin stabilized with a mixture comprising a polyvalent metal salt of a substituted or unsubstituted benzoic acid, preferably a cadmium salt, a substituted polyvalent metal phenolate, preferably a substituted barium phenolate, and an organic phosphite.

The polyvalent metal phenolates, in the compositions of the present invention, have the general formula: $M(OR)_n$, wherein $n$ is the valence of the metal (M), M is selected from cadmium, zinc, lead, tin, barium, strontium, and calcium, and R is selected from alkyl substituted phenols and alkyl substituted phenols containing at least one substituent on the alkyl radical. The polyvalent metal phenolates of the substituted phenols listed below are illustrative of the phenolates that are employed in this invention: butylphenol, monochlorooctylphenyl, nonylphenol, oleylphenol, laurylphenol, and octadecylphenol and dibutylmethylphenol, etc. The preferred phenolates are barium phenolates containing straight chain alkyl substituents having 6 to 13 carbon atoms; especially preferred are barium octylphenolate and barium nonylphenolate.

The organic phosphites utilized in the stabilizer composition of the present invention are selected from the class consisting of substituted or unsubstituted aliphatic or aromatic phosphites, phosphites containing both alkyl and aryl groups, organohalo phosphites and phosphorus halides containing one or two substituted or unsubstituted alkoxy and/or aryloxy groups bonded to the phosphorus atom. These phosphites include trisoctyl phosphite, tris (2-chloroethyl) phosphite, tridecyl phosphite, phosphite ester derivatives of glycols, polyethylene glycols and glycol ethers, triphenyl phosphite, tri-(o-xenyl) phosphite, di-(p-tert-butylphenyl) monophenyl phosphite, diphenyl-mono - orthochlorophenyl phosphite, di - (nonylphenyl)-mono-2-chloroethyl phosphite, diphenylmono-s-chloropropyl phosphite, phenyl-di($\beta$-chloropropyl) phosphite, di-nonyl - $\beta$ - chloropropyl-phosphite, diphenoxychlorophosphorus, octylphenoxydichlorophosphorus, di(nonylphenoxy)dichlorophosphorus, phenoxyoctyloxychlorophosphorus, etc. The aliphatic and mixed aliphatic phosphites containing a beta chloro substitution are prepared by reacting a phosphorus trihalide or an aryloxy (or alkoxy) phosphorus halide with an epoxy-containing material; such materials include epoxy aliphatics, epoxy esters, epoxy ethers, epoxy cyclic aliphatics, alkaryl groups containing an epoxidized alkyl chain, etc. Preferred phosphites are the triaryl phosphites, particularly triphenyl phosphite, and the mixed aryl-aliphatic phosphites, particularly phenyl di(chloroethyl) or ($\beta$-chloropropyl) phosphite, diphenylmonochlorononyl (or octyl) phosphite, diphenyl-mono-chloroethyl (or $\beta$-chloropropyl) phosphite and the reaction product of di(nonylphenoxy) chlorophosphorus and epoxidized soya bean triglyceride. The phosphite utilized should be substantially non-volatile at the conditions under which the resin is worked.

Polyvalent metal salts of the substituted and unsubstituted benzoic acids employed in this invention include the salts of cadmium, zinc, lead, tin, barium, strontium and calcium. The substituted benzoic acids may contain ring substitutions that do not deleteriously affect the properties of the resin, and that are not reactive with other components of the formulation thereby similarly affecting the resin. Permissible substituting groups include fluorine, chlorine, and up to three aliphatic groups, e.g., methyl, isopropyl, tert-butyl, etc., the total number of carbon atoms in said substituting aliphatic groups being not more than 12 carbon atoms. The preferred metal salts are those of cadmium; and the preferred salts are cadmium benzoate and cadmium di(p-tert-butylbenzoate).

As used herein, the terms "parts" or 'part" indicate parts by weight, unless otherwise specified.

The stabilizer compositions of the present invention provide effective stabilization of resin formulations when used in amounts of about 0.25 to about 7 parts (per 100 parts of resin). For plasticized resins, the preferred range of stabilizer addition is about 1 part to about 4 parts per 100 parts of resin. The preferred addition of the stabilizer composition containing cadmium di(p-tert-butylbenzoate), or cadmium benzoate, barium di[octyl (or nonyl) phenolate] and the phosphite, is about 1 to 2 parts per 100 parts of resin. For "rigids," the preferred range of stabilizer addition is about 1.5 parts to 10 parts per 100 parts of resin and preferably about 1.5 parts to about 6 parts per 100 parts of resin.

The stabilizer compositions contain between about 20% to about 80%, and preferably about 20% to about 40%, of the polyvalent metal salt of the benzoic acid, about 80% to about 20%, and preferably about 60% to about 40% of the polyvalent metal phenolate, and about 0.5% to about 50% and preferably about 8% to about 30% of the phosphite. The preferred stabilizer contains about 20% to about 40% of cadmium di(p-tert-butylbenzoate) or cadmium benzoate, about 45% to about 55% of barium octylphenolate or nonylphenolate, and the remainder triphenyl phosphite or diphenylchloroethyl (or propyl) phosphite.

Many materials have been found to be effective stabilizers in that they retard, in some degree, the deteriorative effects of heat and/or light. To be suitable for commercial use, the stabilizers must be compatible in the resin, must have a minimum of plate-out during milling, and must prevent the deteriorative effects of heat and/or light. This last property is usually determined by examination of the color and clarity of resins tested at high temperatures. The most desirable stabilized resins are those that are initially clear and transparent and retain this condition for the longest period of time. The onset of a distinct yellow cast to a transparent stabilized resin is an indication of the limit of usefulness of the resin. The stabilizers of the present invention are particularly effective in this respect. Resins formulated with these stabilizers exhibit remarkable clarity and do not show effects of yellowing for a longer period of time than do other known stabilizers of the same general type (mixed metallic salts of acids and phenols).

The following examples are further illustrative of the present invention. It is to be understood, however, that the invention is not restricted to the specific embodiments described herein in detail.

The resin formulations containing the stabilizer compositions of this invention, or prior art stabilizers indicated below, were prepared by milling the base formulations and stabilizer components together for 5 minutes on a 2-roll differential speed mill, at 320° F. The resin, having the stabilizer incorporated therein, was removed as a pressed sheet and cut into strips for testing. To test the heat stability of these strips, they were placed in a circulating air oven maintained at 350° F. Samples were removed after 15, 30, 45, 60, 90 and 120 minutes (unless otherwise indicated below) and were rated using the following color code:

(C)—clear;
(SY)—the sheet being still, essentially clear, but having a distinct faint yellow cast;
(LY)—light yellow;
(DY)—deep yellow;
(T)—tan;
(A)—amber, the sheets still retaining some translucency;
(Br)—brown;
(Bl)—black opaque.

The base formulation for the following examples (Examples 1 through 14) comprises 100 parts of polyvinyl chloride resin, 45 parts of dioctyl phthalate, 3 parts epoxidized soya bean oil and 0.5 part of stearic acid unless otherwise indicated. The stabilizer added is designated in the second column of the table.

The octylphenolates and the nonylphenolates shown in any of the tables below were prepared from commercial products. The specification for the commercial nonylphenol utilized states that it is a mixture of monoalkyl phenols, predominantly para substituted (92 to 95% para isomer). The side chains are random branched alkyl radicals. The specification for the octylphenol states that it is predominantly the para isomer and is believed to be about 99% para.

Butyl epoxy stearate mentioned herein is prepared by the epoxidation of the butyl ester of oleic acid by well known prior art processes e.g., using an acetic acid solution of peracetic acid as the epoxidizing agent. The epoxidized oil referred in the specification and claims as "epoxidized soya bean oil" or "epoxidized soya bean triglyceride" is an article of commerce sold by Rohm and Haas and identified by the manufacturer by the symbol G60. The manufacturer's specifications indicate that this material has an epoxy oxygen content of six to six and one-half and an iodine member of two to six. It may also be prepared by well known prior art processes by the expoxidation of refined soya bean oil using an acetic acid solution of peracetic acid as the epoxidizing agent.

TABLE 1

(A) STANDARDS AND PRIOR ART STABILIZERS

| Example Number | Parts (per 100 parts of polyvinyl chloride resin) | Component |
|---|---|---|
| 1 | | No stabilizer. |
| 2 | 2 | barium di (nonylphenolate). |
| 3 | 2 | cadmium di(p-tert-butylbenzoate). |
| 4 | 0.5 | triphenylphosphite. |
| 5 | 0.6 | barium di(nonylphenolate). |
|  | 0.3 | cadmium di(2-ethylhexoate). |
|  | 0.3 | triphenyl phosphite. |

(B) STABILIZERS OF PRESENT INVENTION

| Example Number | Parts | Component |
|---|---|---|
| 6 | 0.8 | barium di(nonylphenolate). |
|  | 0.4 | cadmium di(p-tert-butylbenzoate). |
|  | 0.4 | triphenylphosphite (only 0.25 part of stearic acid). |
| 7 | 0.581 | barium di(nonylphenolate). |
|  | 0.246 | cadmium benzoate. |
|  | 0.290 | triphenylphosphite. |
| 8 | 0.830 | strontium di (nonylphenolate). |
|  | 0.329 | cadmium di(p-tert-butylbenzoate). |
|  | 0.290 | triphenylphosphite. |
| 9 | 0.581 | barium di(nonylphenolate). |
|  | 0.246 | cadmium di(p-tert-butylbenzoate). |
|  | 0.290 | reaction product of di(nonylphenoxy) chlorophosphorus with epoxidized soya bean triglyceride. |
| 10 | 0.581 | barium di (nonylphenolate). |
|  | 0.328 | cadmium di (p-tert-butylbenzoate). |
|  | 0.290 | dinonylphenylbutyl chlorostearyl phosphite (reaction product of di (nonylphenoxy) chlorophosphorus and butyl epoxy stearate). |
| 11 | 0.581 | barium di (octylphenolate). |
|  | 0.328 | cadmium di (p-tert-butylbenzoate). |
|  | 0.290 | triphenyl phosphite. |
| 12 | 0.581 | barium di (butylphenolate). |
|  | 0.328 | cadmium di (p-tert-butylbenzoate). |
|  | 0.290 | triphenyl phosphite. |
| 13 | 0.581 | barium di (nonylphenolate). |
|  | 0.328 | cadmium di (p-tert-butylbenzoate). |
|  | 0.290 | di (nonylphenoxy) chloro phosphorus. |
| 14 | 0.581 | barium di (nonylphenolate). |
|  | 0.328 | cadmium di (p-tert-butylbenzoate). |
|  | 0.290 | triphenyl phosphite. |

The results of the heat stabilization tests for the above compositions are set forth in Table II below. The entries under "M" in this table and other tables below indicate the color of the resin composition including the stabilizer, if any, after being prepared and milled as described above, but before being subjected to treatment in the circulating air oven.

TABLE II

| Composition of Example | M | Minutes | | | | | |
|---|---|---|---|---|---|---|---|
| | | 15 | 30 | 45 | 60 | 90 | 120 |
| 1 | C | C | DY | T | T | A | Br |
| 2 | DY | DY | T | T | Br | Br | Br |
| 3 | C | C | C | Bl | Bl | Bl | Bl |
| 4 | C | C | DY | T | Br | Br | Br |
| 5 | C | C | C | C | LY | T | T |
| 6 | C | C | C | C | C | C | SY |
| 7 | C | C | C | C | C | C | C |
| 8 | C | C | C | C | C | C | SY |
| 9 | C | C | C | C | C | SY | SY |
| 10 | C | C | C | C | C | SY | LY |
| 11 | C | C | C | C | C | C | C |
| 12 | C | C | C | C | C | C | SY |
| 13 | C | C | C | C | C | C | SY |
| 14 | C | C | C | C | C | C | SY |

As previously noted, the limit of the usefulness of the stabilized resin composition is the onset of a distinct yellow cast which is indicated by the symbol SY. The excellent heat stability exhibited by resins containing the stabilizers of the present invention is clearly brought out in Table II. Example 1 contains no stabilizer and serves as a standard for comparison. Examples 2 to 4 illustrate the effect of the individual stabilizer components employed in this invention. The results clearly demonstrate that stabilization effect of the composite stabilizer of this invention is far superior to any of its individual components. In Example 5 cadmium di(2-ethylhexoate) is used in place of the cadmium salt of a benzoic employed in this invention. The composition of Example 5 most closely resembles the composition of Example 14. As shown in Table II the composition of Example 5 had reached its limit of usefulness between 45 and 60 minutes whereas it took 120 minutes before the composition of Example 14 reached its limit of usefulness. The limit of the usefulness of the composition of Example 14 is more than 200% the limit of the usefulness of the composition of Example 5.

In the following examples the following base formulation was employed:

| | Parts |
|---|---|
| Polyvinyl chloride resin | 100 |
| Dioctyl phthalate | 45 |
| Epoxidized soya bean oil | 3 |
| Stearic acid | 0.5 |

The stabilizers indicated in Table III below were incorporated in this base formulation and worked up in the same manner described above.

TABLE III

| Example Number | Parts (per 100 parts of polyvinyl chloride resin) | Components |
|---|---|---|
| 15 | 0.581<br>0.328<br>0.290 | barium di(nonylphenolate).<br>cadmium di(p-tert-butylbenzoate).<br>triphenyl phosphite. |
| 16 | 0.581<br>0.3<br>0.290 | barium di(nonylphenolate).<br>cadmium di(2-ethylhexoate).<br>triphenyl phosphite. |
| 17 | 0.872<br>0.492<br>0.435 | barium di(nonylphenolate).<br>cadmium di(p-tert-butylbenzoate).<br>triphenyl phosphite. |

These materials were subjected to the heat stability test described above and the results are indicated below.

TABLE IV

| Composition of Example | M | Minutes | | | | | |
|---|---|---|---|---|---|---|---|
| | | 15 | 30 | 45 | 60 | 90 | 120 |
| 15 | C | C | C | C | C | C | C |
| 16 | C | C | C | C | C | SY | LY |
| 17 | C | C | C | C | C | C | C |

Examples 15 and 17 are representative of the compositions of the present invention, whereas in Example 16 cadmium di(2-ethylhexoate) is employed. To determine the limit of usefulness of the composition of Example 15, as compared with Example 16 which employs cadmium di(2-ethylhexoate), further heat stabilization tests were conducted using the compositions of Examples 15 and 16, wherein the heating was extended over a longer period of time. These experiments are designated in Table V as 15' and 16', respectively.

TABLE V

| | M | Hours | | | | |
|---|---|---|---|---|---|---|
| | | 1 | 1½ | 2 | 2½ | 3 |
| 15' | C | C | C | C | SY | SY |
| 16' | C | C | C | SY | LY | LY |

It can be seen from Table V that the limit of usefulness of the composition 15 of this invention was 3 hours whereas the limit of the usefulness of composition of Example 16 is between 2 and 2½ hours.

It is often necessary, in the formulation of resin compositions, to include a zinc compound, e.g. zinc di(2-ethylhexoate), for purposes other than the stabilization of the resin. These zinc compounds, however, adversely affect the heat stability of the resin. It has been found that the stabilizer compositions in this invention even greatly improves the heat stability of such compositions. This is demonstrated in Table VII below.

The base formulation used in the following examples is the same used for the compositions of Table III. These were worked up and tested in the same manner described above. For purpose of comparison, a composition containing caduim di(2-ethylhexoate) is included in the table.

TABLE VI

| Example Number | Parts (per 100 parts of polyvinyl chloride resin) | Components |
|---|---|---|
| 18 | 0.436<br>0.246<br>0.217<br>0.073<br>0.045 | barium di(nonylphenolate).<br>cadmium di(p-tert-butyl-benzoate).<br>triphenyl phosphite.<br>zinc di(2-ethylhexoate).<br>diluent containing .3 parts triphenyl phosphite. |
| 19 | 0.872<br>0.45<br>0.435<br>0.5 | cadmium di(2-ethylhexoate).<br>barium di(nonylphenolate).<br>triphenyl phosphite.<br>zinc di(2-ethylhexoate) triphenyl phosphite diluent. |

TABLE VII

| Composition of Example | M | Minutes | | | | | |
|---|---|---|---|---|---|---|---|
| | | 15 | 30 | 45 | 60 | 90 | 120 |
| 18 | C | C | C | C | C | C | C |
| 19 | C | C | C | C | Bl spots | Bl | Bl |

Example 18 is illustrative of the present invention and is shown to be superior to the corresponding composition of claim 19 which employs cadmium di(2-ethylhexoate).

The stabilizer compositions of this invention have the further advantage in that considerably smaller amounts are necessary to obtain a high degree of stabilization as compared with prior art stabilizers. The examples given in Tables VIII and IX demonstrate this advantage. Comparison is made with the corresponding composition containing cadmium di(2-ethylhexoate).

The base formulation used in the preparation of the resins illustrated in Tables VIII and IX is as follows:

| | Parts |
|---|---|
| Polyvinyl chloride resin | 100 |
| Dioctyl phthalate | 45 |
| Epoxidized soya bean oil | 3 |
| Stearic acid | 0.5 |

The stabilizers indicated in the third column were incorporated in the base formulation and worked up in the same manner as described above.

TABLE VIII

| Example Number | Parts (per 100 parts of polyvinyl chloride resin) | Components |
|---|---|---|
| 20 | 0.58 / 0.29 / 0.3 | barium di (nonylphenolate). / triphenyl phosphite. / cadmium di (p-tert-butylbenzoate). |
| 21 | 0.87 / 0.44 / 0.45 | barium di (nonylphenolate). / triphenyl phosphite. / cadmium di (2-ethylhexoate). |

TABLE IX

| Composition of Example | M | Hours | | | | |
|---|---|---|---|---|---|---|
| | | 1 | 1½ | 2 | 2½ | 3 |
| 20 | C | C | C | C | SY | SY |
| 21 | C | C | C | SY | LY | LY |

Composition of Example 21 is exemplary of a prior art composition. It is seen that a one-third smaller amount of the stabilizer of Example 20, illustrating this invention, gives results that are superior to those of Example 21. In Example 20, after 3 hours, the limit of usefulness had not yet been exceeded, whereas in Example 21, the limit of usefulness had been passed at 2½ hours.

The following examples further illustrate the superiority of the stabilizers of this invention as compared with the seemingly similar composition employing cadmium di(2-ethylhexoate). The base formulation for the following examples is as follows:

| | Parts |
|---|---|
| Polyvinyl chloride resin | 100 |
| Dioctyl phthalate | 45 |
| Epoxidized soya bean oil | 3 |
| Stearic acid | 0.5 |

The stabilizers were incorporated in the base formulation and worked up in the same manner described above. The compositions with cadmium di(2-ethylhexoate) are included for comparison.

TABLE X

| Example Number | Parts (per 100 parts of polyvinyl chloride resin) | Components |
|---|---|---|
| 22 | 0.58 / 0.29 / 0.3 | barium di (nonylphenolate). / triphenyl phosphite. / cadmium di (2-ethylhexoate). |
| 23 | 0.435 / .22 / .22 | barium di (nonylphenolate). / triphenyl phosphite. / cadmium di (2-ethylhexoate). |
| 24 | 0.87 / 0.44 / 0.45 | barium di (nonylphenolate). / triphenyl phosphite. / cadmium di (p-tert-butylbenzoate). |

TABLE XI

| Composition of Example | M | Hours | | | | | | | |
|---|---|---|---|---|---|---|---|---|---|
| | | ¼ | ½ | ¾ | 1 | 1½ | 2 | 2½ | 3 |
| 22 | C | | | | C | C | SY | LY | LY |
| 23 | C | C | C | C | Y | DY | DY | | |
| 24 | C | | | | C | C | C | C | C |

The mill rolls were observed during the preparation of all samples and it was noted that a minimum of plate-out occurred when preparing formulations including the stabilizer of the present invention. The amount of plate-out varies with the stabilizer and pigment present in the formulation. It is known that plate-out can usually be minimized with a given stabilizer-pigment formulation by the addition to the formulation of a zinc salt of an aliphatic acid. Therefore, it is important that stabilizer compositions not only be compatible in the resin formulation but also give good stabilization results when combined with a zinc salt additive. Test Nos. 18 and 19 were carried out with stabilizer compositions to which had been added specified amounts of zinc di(2-ethylhexoate). Test No. 18 is a stabilizer within the scope of the present invention, whereas Test No. 19 utilized a commercial stabilizer. As noted above, test results Nos. 18 and 19 clearly bring out the superiority of stabilizers of this invention when used in conjunction with a zinc salt of an organic acid.

A careful visual examination of the resins stabilized with the stabilizer composition of the present invention shows that the milled sheets exhibit a remarkable degree of clarity. They have been compared with numerous stabilized resins prepared in the same manner but utilizing various commercial stabilizers including those based on the polyvalent metal salts of phenolates and polyvalent metal salts of fatty acids and octoic acid, and they have been found to be far superior in respect to this characteristic.

In addition to the heat tests detailed hereinbefore, which illustrate the stabilizing properties of the stabilizers of this invention when compounded in a plasticized vinyl resin, it has also been found that these stabilizer compositions stabilize other plasticized and unplasticized resin compositions.

Two samples were prepared containing one part of chlorinated rubber (67% chlorine) dissolved in three parts of toluene. To the second sample was added 3% by weight of dibutyl phthalate and 4% by weight of epoxidized soya bean oil based on the chlorinated rubber. The same amounts of the aforementioned plasticizers were added to the first sample and also 2 parts per 100 parts of chlorinated rubber of a stabilizer containing 0.581 of barium di(butyl phenolate), 0.328 cadmium di(p-tert-butylbenzoate), 0.29 triphenylphosphite and 0.8 isooctyl alcohol. Films were cast on glass and heated in an air circulating oven held at 140° C. for 35 minutes. The film prepared from the first sample had a very pale yellow cast, whereas the film prepared from the second sample turned a pale amber.

Two samples comprising 100 parts of a vinyl chloride-acetate copolymer (95% chlorine) were dry blended with 30 parts of dioctyl phthalate. The first sample was stabilized with 2 parts per 100 parts of said copolymer of the barium-cadmium stabilizer as defined in the preceding paragraph. Each of the samples was then worked on a rubber mill at about 300° F. for 40 minutes. The first sample, which included the barium-cadmium stabilizer, had a very pale yellow tint, whereas the second sample (unstabilized) was a dark yellow.

Two samples comprising 100 parts of a vinyl chloride-dibutyl maleate copolymer were dry blended with 35 parts of dibutyl sebacate. The first sample was stabilized as specified in the preceding paragraph and both samples worked as specified in the preceding paragraph, with similar results.

The stabilizers of the present invention are also effective stabilizers for organosols and plastisols. Plasticizers commonly used in plasticized resins, organosols and plastisols include esters of the following acids: phthalic acid, adipic acid, sebacic acid, azelaic acid, citric acid, aconitic acid, tricarboxylic acid, maleic, fumaric, succinic, phosphoric acid, and mercapto acids like thioglycolic acids and the like: esters of dihydric and polyhydric alcohols, such as glycol, glycerol, pentaerythritol, sorbitol and the like: esters of thioglycols and other sulfur-containing derivatives: amino alcohol derivatives: ester amides, sulfonamides and other amides, chlorinated plasticizers, carbonic acid derivatives derived from phosgene.

Other halogen-containing resins, which are rendered heat and light resistant by the stabilizers of this invention, are, for instance, polymers of vinyl chloride and vinyl resins containing vinyl chloride units in their structure, such as copolymers of vinyl chloride with vinyl esters of aliphatic carboxylic acids, particularly vinyl acetate, copolymers of vinyl chloride with esters, nitriles and amides of unsaturate carboxylic acids, e.g. of acrylic and methacrylic acid, copolymers of vinyl chloride with diene compounds and with unsaturated dicarboxylic acids or their anhydrides, such as copolymers of vinyl chloride with diethyl maleate, diethyl fumarate or maleic anhydride, after-chlorinated polymers and copolymers of vinyl chloride, polymers of vinylidene chloride and copolymers of the same with vinyl chloride and other polymerizable compounds; polymers of vinyl chloroacetate and dichlorodivinyl ether; chlorinated polymers of vinyl acetate, chlorinated polymeric esters of acrylic and alpha-substituted acrylic acids; polymers of chlorinated styrenes, for instance, dichlorostyrene; chlorinated rubber, chlorinated polymers of ethylene, polymers and after-chlorinated polymers of chlorobutadienes, and their copolymers with vinyl chloride; rubber hydrochloride and chlorinated rubber hydrochloride; and mixtures of the polymers recited herein with each other or other polymerizable compounds. The corresponding bromides and fluorides are equally well stabilized.

While the invention has been described with particular reference to specific embodiments, it is to be understood that it is not limited thereto but is to be construed broadly and restricted solely by the scope of the appended claims.

What is claimed is:

1. A heat and light stabilized resin composition comprising at least one vinyl resin selected from the class consisting of homopolymers of vinyl chloride, copolymers of vinyl chloride and vinyl acetate, and copolymers of vinyl chloride and vinylidene chloride, and between 0.25 and 10 parts per 100 parts of the resin of a stabilizer composition comprising between 20% to 80% of at least one salt selected from the class consisting of cadmium di(p-tert-butyl benzoate) and cadmium dibenzoate, and between 80% to 20% of at least one phenolate selected from the class consisting of barium di(octylphenolate), barium di(nonyl phenolate), barium di(nonyl-o-cresolate), strontium di(octyl phenolate), strontium di(nonyl-phenolate), strontium di(nonyl-o-cresolate), and between 0.5% and 50% triphenyl phosphite.

2. A heat and light stabilized resin composition comprising at least one vinyl resin selected from the class consisting of homopolymers of vinyl chloride, copolymers of vinyl chloride and vinyl acetate, and copolymers of vinyl chloride and vinylidene chloride, and between 0.25 and 10 parts per 100 parts of the resin of a stabilizer composition comprising between 30% to 40% of at least one salt selected from the class consisting of cadmium di(p-tert-butyl benzoate) and cadmium dibenzoate, and between 60% to 40% of at least one phenolate selected from the class consisting of barium di(octyl phenolate), barium di(nonyl phenolate), barium di(nonyl-o-cresolate), strontium di(octyl phenolate), strontium di(nonyl phenolate), strontium di(nonyl-o-cresolate), and between 0.5% and 25% triphenylphosphite.

3. A heat and light stabilized resin composition comprising a vinyl resin selected from the class consisting of homopolymers of vinyl chloride, copolymers of vinyl chloride and vinyl acetate, and copolymers of vinyl chloride and vinylidene chloride, and between about 1 and 4 parts per 100 parts of the resin of a stabilizer composition comprising between 30% and 40% of cadmium di(p-tert-butyl benzoate), 60% and 40% of barium di(nonyl phenolate), and between 8% and 30% triphenylphosphite.

4. A heat and light stabilized resin composition comprising a vinyl resin selected from the class consisting of homopolymers of vinyl chloride, copolymers of vinyl chloride and vinyl acetate, and copolymers of vinyl chloride and vinylidene chloride, and between about 1 and 4 parts per 100 parts of the resin of a stablizer composition comprising between 30% and 40% of cadmium di(p-tert-butyl benzoate), 60% and 40% of barium di(octyl phenolate), and between 8% and 30% triphenylphosphite.

5. A heat and light stabilized resin composition comprising a vinyl resin selected from the class consisting of homopolymers of vinyl chloride, copolymers of vinyl chloride and vinyl acetate, and copolymers of vinyl chloride and vinylidene chloride and a stabilizer composition comprising between 0.5 and 0.6 part of barium di(nonyl phenolate), between 0.3 and 0.4 part of cadmium di(p-tert-butyl benzoate) and between 0.2 and 0.4 part of triphenylphosphite, all parts per 100 parts of resin.

References Cited in the file of this patent

UNITED STATES PATENTS

| | | |
|---|---|---|
| 2,598,496 | Bradley | May 27, 1952 |
| 2,716,092 | Leistner | Aug. 23, 1955 |
| 2,782,176 | Darby | Feb. 19, 1957 |